United States Patent [19]

Abe

[11] Patent Number: 5,041,830
[45] Date of Patent: Aug. 20, 1991

[54] BAND COMPRESSION CIRCUIT

[75] Inventor: Miki Abe, Kanagawa, Japan

[73] Assignee: Sony Corporation, Tokyo, Japan

[21] Appl. No.: 538,265

[22] Filed: Jun. 14, 1990

[30] Foreign Application Priority Data

Jun. 20, 1989 [JP] Japan .................................. 1-157339

[51] Int. Cl.⁵ ........................ H03M 7/32; H03M 3/02
[52] U.S. Cl. ...................................... 341/77; 341/143; 341/95
[58] Field of Search ..................... 341/102, 77, 75, 76, 341/95, 110, 143; 375/30, 14

[56] References Cited

U.S. PATENT DOCUMENTS

| | | | |
|---|---|---|---|
| 3,931,596 | 1/1976 | Gersho et al. | 341/143 |
| 4,059,800 | 11/1977 | Jones, Jr. | 341/143 X |
| 4,355,304 | 10/1982 | Kasuga et al. | 341/75 |
| 4,682,152 | 7/1987 | Okamoto et al. | 341/95 |

Primary Examiner—A. D. Pellinen
Assistant Examiner—Sharon D. Logan
Attorney, Agent, or Firm—Philip M. Shaw, Jr.

[57] ABSTRACT

A band compression device for digital signals in which input digital data are subjected to floating to realize bit reduction and in which a high speed compressing operation is made possible by shifting the input digital data by a number of bits equal to about one half the maximum shift quantity before starting the floating operation for the input digital data.

8 Claims, 6 Drawing Sheets

BAND COMPRESSION CIRCUIT

BACKGROUND OF THE INVENTION

1. Field of the Invention

This invention relates to a band compression circuit for reducing the number of bits of signals digitized from analog signals prior to transmitting the digitized signals.

2. Prior Art

Recently, with digital signals obtained upon sampling, quantizing and encoding analog audio or video signal, or so-called pulse code modulated signals (PCM signals), it has become possible to reduce the data quantity by taking advantage of the fact that the statistical properties of these digital signals exhibit certain variations and that certain portions of the signals are less critical in view of their effects on the visual and auditory senses. Thus it has been known that the signals undergo only little degradation in quality by differential, summation or companding operations for bit reduction.

One of such techniques of data compression or band compression is the floating operation as described in the Japanese Patent Publication No. 64 558 (1989). The floating operation resides in shifting n-bit input data by an amount corresponding to the data value and taking out m bits (where m<n) by way of performing a local quantization. As an example, a floating operation consisting in compressing 16-bit-per-word input data in a 2's complement representation to 8-bit data and taking out the compressed data is explained by referring to FIGS. 1a to 1f, inclusive.

FIGS. 1a to 1f show the amount of bit shifts consistent with the range of values of the above mentioned 16-bit-per-word input data wherein only the positive value or the absolute value are taken into consideration. FIG. 1a shows the case in which the range of the input data values is 0 to 127 and the number of significant bits in the 16-bit input data is 7 or less, while FIGS. 1b to 1i show the cases in which the numbers of significant bits in the 16-bit input data are 8 to 15, respectively. In FIGS. 1a to 1i, the areas shown by hatched lines represent the significant bits, with the exception of FIG. 1a wherein the areas shown by hatched lines indicate the upper limit or the maximum value of the significant bit.

Referring first to FIG. 1a, since the number of the significant bits within the 16-bit input data is 7 or less, bit compression can be made by shifting the data by eight bits and taking out the upper eight bits without a rounding error (quantization error) at the time of the local quantization. Turning to FIG. 1b, since the range of input data values is 128 to 258, and the number of significant bits within the 16 bits, indicated by the area shown by hatched lines, is 8, the upper 8 bits can be taken out by shifting the input data by seven bits, with the rounding error being 1 bit. Turning to FIGS. 1c to 1i, since the numbers of significant bits are 9 to 15, respectively, the amounts of bit shift are 6 to 0 bits, respectively, with the rounding errors, indicated by the area shown by cross-hatched lines, being 2 to 8 bits, respectively. These rounding errors are fed back to the input side of the local quantizer (error feedback) for performing a so-called noise shaping, as disclosed in an article entitled "Adaptive Noise Spectral Shaping and Entropy coding in Predictive Coding of Speech" appearing at pages 63 to 73 of IEEE Transactions on Acoustics, Speech and Processing, vol, ASSP-27, No. 1, February 1979.

On many occasions, such a floating operation is implemented by a software program using a so-called digital signal processor (DSP). An example of an essential portion of the software program is shown in the following Table 1.

TABLE 1

| FLOAT | LAC | xn,1 | Load input data to accumulator with 1 bit shift to left |
|---|---|---|---|
| | SACL | xn | Restore accumulator data in memory |
| | SUBS | MAX | Compare with MAC (7FFF) |
| | BLEZ | FLOAT | to FLOAT when accumulator data is MAX or less |

On many occasions, such a floating operation is executed by so-called block floating by arranging input data consisting of a predetermined number of words into one block. In such case, the shifting quantity is determined on the basis of the peak value of the words in each block, and the totality of words in the block are bit-shifted by the same quantity.

FIG. 2 is a flow chart showing a practical example of a bit shifting program applied to a floating operation in which, as an example of the block floating, 16-bit-per-word input data in 2's complement representation are arranged into blocks, each consisting of a predetermined number of, for example, 28 words, the totality of words in each block are compressed to 8 bits by bit-shifting by the same quantity and the thus compressed data are taken out in the form of 8-bit compressed data. With the example shown in FIG. 2, when the number of the significant bits of input data is 8 bits, with the data value being 0 to 255, shifting by 8 or 7 bits is performed at one time. However, when the number of significant bits of the input data is 9 or more, the bit shifting operation by the above mentioned loop program is realized by a series of the decision steps to speed up the operation. In FIG. 2, P indicates the peak value which is the maximum value of the words in each block. The range of the peak value P is analyzed to determine the shift quantity.

In a first step 80 of FIG. 2, it is determined if the peak value P is 127 or less (P<127?), that is if the number of the significant bits is 7 or less. If the result is YES, the program proceeds to step 9 where the input data are shifted by 8 bits towards the left as shown in FIG. 1a to output the upper 8 bits. If the result is NO, the program proceeds to step 81 where the peak value P is divided by 256 and the resulting quotient is set as a new peak Value $P_t$ ($P_t = P/256$) The program then proceeds to step 82.

In step 82, it is determined if the peak value $P_2$ is equal to zero. This operation is equivalent to determining if the original peak value P is 255 or less. If the result of the decision at step 82 is YES, the original peak value P is in the range from 128 to 255 (taking the result of the decision at step 80 into consideration) The program then proceeds to step 92 where the input data are shifted by 7 bits towards the left as shown in FIG. 1b to output the upper 8 bits. If the result of the decision at step 82 is NO, the program proceeds to the next step 83.

In step 83, a value equal to twice the peak value $P_t$, or $2P_t$, is compared with 127, to determine if $2P_t$ is larger than 127 ($2P_t > 127$?). The operation in step 83 is equivalent to determining if the original peak value P is 16384 or more, that is if the number of significant bits is 15 or more. If the result of the decision at step 83 is YES, the program shifts to step 93 where the input data are shifted by zero bits towards the left, that is, not shifted towards the left, as shown in FIG. 12, and only the upper 8 bits are output. If the result of the decision at step 83 is NO, the program proceeds to step 84.

At step 84, it is determined if a value equal to twice the peak value $P_t$, or $2P_t$, is larger than 63 ($2P_t > 63$?) The operation at step 84 is equivalent to determining if, in conjunction with the decision at step 83, the number of significant bits of the original peak value P is equal to 14 bits, that is, if the original peak value P is within the range from 8192 to 16383 as shown in FIG. 1h. If the result of the decision at step 84 is YES, the program proceeds to step 94 where the input data are shifted by one bit towards the left as shown in FIG. 1h and only the upper 8 bits are output. If the result is NO, the program proceeds to next step 85.

At the following decision blocks 85 to 88, it is determined if the number of the significant bits of the original peak value P is equal to 13 to 10, respectively. If the results of the decisions at the decision blocks 85 to 88 are YES, the program proceeds to steps 95 to 98, respectively, where the input data are shifted by 2 to 5 bits, respectively, as shown in FIGS. 1g to 1d, respectively, with the upper 8 bits being output. If the results of the decisions at decision blocks 85 to 87 are NO, the program proceeds to the next decision blocks 86 to 88, respectively. If the result of the decision at step 88 is NO, the program proceeds to step 99 where the input data are shifted by 6 bits towards the left as shown in FIG. 1c, with the upper 8 bits being output.

When the floating operation is performed in accordance with the loop program shown in Table 1, the execute time per loop of the program amounts to 500 ns, with the machine cycle of the DSP of, for example, 100 ns, so that the total execute time for the maximum shift quantity of 8 bits amounts to 500 ns×8=4 μs. In a practical system, When the number of significant bits of the input data is less than the lower 8 bits (0 to 255), and the shift quantity is 8 or 7 bits, shifting is executed within one machine cycle by using a so-called barrel shifter. However, even with such a practical system, if the input data are 256 to 511 and the shift quantity is a maximum of 6 bits, an execute time as long as 500 ns×6=3 μs is necessitated to carry out only the looping step.

In practice, however, the execute time amounts to two to 2.5 times this figure because the operation of storing shift or ranging data in other memories or the above mentioned noise shaping operation need to be performed within the same loop in addition to the operation shown in Table 1. This problem is felt most acutely when the processings of several channels need to be performed in a time sharing fashion within one sample period. For example, when a compression of two channels is to be performed at a sampling frequency of 32 kHz, about half of the execute time is consumed in carrying out solely the floating operation, so that a limitation is imposed on the time to be allocated for the above mentioned other signal processing operations.

If the above mentioned looping operation is realized by a series of a number of the decision steps for increasing the processing speed, as shown in FIG. 2, the steps 80 to 88 and the shift steps 98 or 99, totalling 10 steps, are required just for a bit shift operation when the number of the significant bits of the peak value P is equal to 9 (265 to 511) or 10 (512 to 1023), resulting in more stringent limitations imposed on the remaining operations.

SUMMARY OF THE INVENTION

It is therefore a principal object of the present invention to provide a band compression circuit for digital signals wherein a shorter time can suffice for realizing bit shifting involved in a floating operation.

In a band compression circuit for digital signals according to the present invention, in which input digital data are subjected to floating to effect bit compression, the input digital data are shifted, in advance of the start of the floating operation, by a number of bits approximately equal to one half the maximum shift quantity, and compared with the maximum value to speed up the bit shifting operation.

In more detail, prior to the floating operation, the input digital data are shifted towards the left by a number of bits approximately equal to one half the maximum shift value for comparison with the maximum value. If the shifted data exceed the maximum value, the original, unshifted data are then subjected to the usual shifting, whereas, if the shifted data are less than the maximum value, the shifted data are subjected to the usual shifting operation, whereby the steps of shifting until the input data reaches approximately one half the maximum shift value can be eliminated to realize a high speed processing.

DETAILED DESCRIPTION OF THE EMBODIMENT

Figure 3:
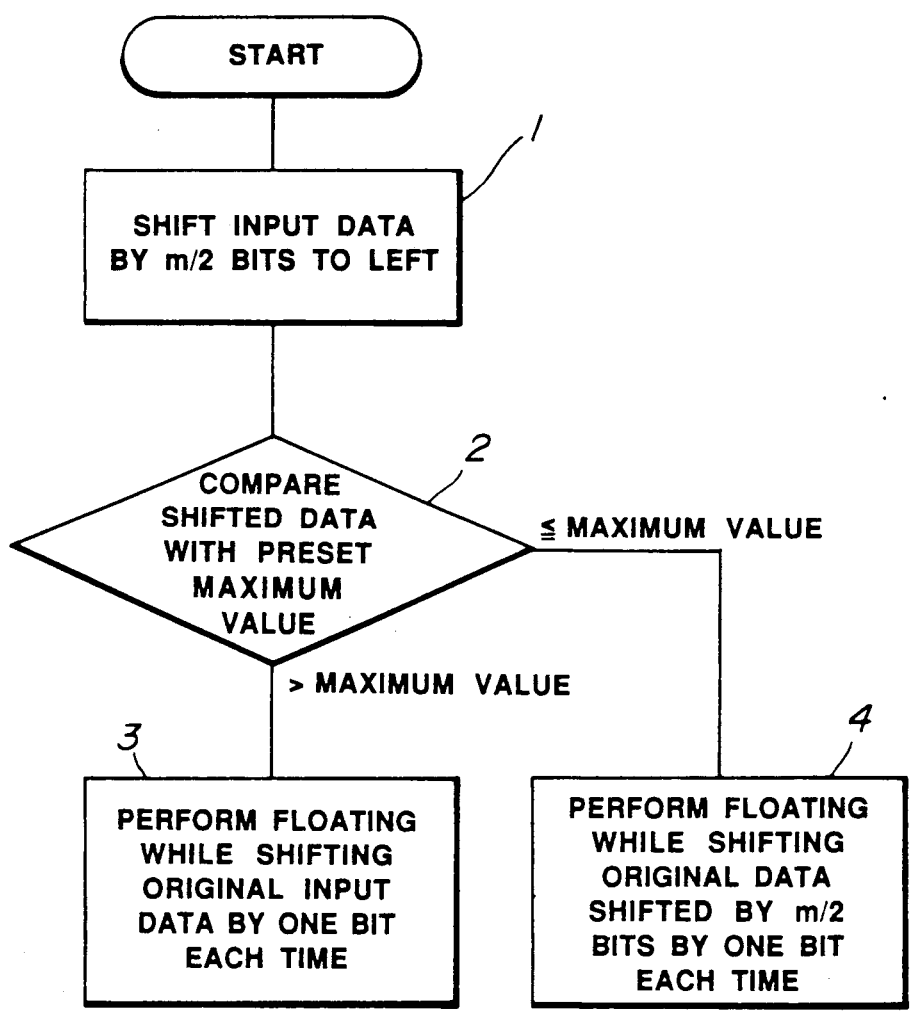
FIG. 3 is a flow chart for illustrating the floating operation of a basic embodiment of the band compression circuit according to the present invention.

FIG. 3 is a flow chart for illustrating a basic embodiment of the present invention. In this figure, it is assumed that the maximum shift quantity for the floating operation is m. The input data are shifted at step 1 towards the left by m/2 bits, or by a number of bits approximately equal to m/2 bits.

At step 2, the shifted data is compared with a preset maximum data value. If the shifted data is larger than the maximum value, that is, if an overflow occurs, the program proceeds to step 3. If the shifted data is less than the maximum value, the program proceeds to step 4.

At step 3, the usual floating operation is carried out in which the original input data, that is the input data before shifting, is shifted towards the left by, for example, 1 bit each, and the thus shifted data are compared with the maximum value.

At step 4, the usual floating operation is performed in which the input data shifted at step 1 are shifted towards the left by, for example, 1 bit each time, and the thus shifted data are compared with the maximum value.

By performing the sequence of the floating operation in the manner described above, the number of times data is shifted for floating can be reduced from m in the conventional practice to about (1+m/2) to realize a higher speed in the processing operation.

A practical example of the above mentioned basic operation is hereinafter explained by referring to FIGS. 4a to 4i. In the example, the input digital data, which are 16-bit data in 24 complement representation, are shifted towards the left by a predetermined number of bits, up to a maximum of eight bits, so that the upper 8 bits are taken out, by way of performing a floating operation. The maximum value of the input data are 7FFF in hexadecimal notation (or 32767 in decimal notation). Since m/2, which is one half the maximum shift value, or approximately so, is 4, the input data are shifted by four bits towards the left.

When digital data composed of nine significant bits as shown in FIG. 4a and having data values in the range of 256 to 511 are input, the value obtained by shifting the data by four bits towards the left, or multiplied by 16, is expressed as a value within the range from 4096 to 8176, as shown in FIG. 4b, on the condition that the value is a multiple of 16. Since this value is less than the above mentioned maximum value of 32767, the data shifted by four bits towards the left are subjected to the usual floating operation of shifting the data by, for example, one bit each time and the shifted data are compared with the maximum to find the shift value.

That is, the data already shifted four bits towards the left, as shown in FIG. 4b, are shifted one bit towards the left to give data having a data FIG. 4c, on the condition that the data is a multiple of 32. Since the data shown in FIG. 4c is not more than the above mentioned maximum value of 32767, it is shifted again by one bit towards the left to give data having a data value in the range from 16384 to 32704, as shown in FIG. 4d, on the condition that it is a multiple of 64. Since the data of FIG. 4d, shifted by one bit towards the left, exceeds the above mentioned maximum value of 32767, that is, overflow occurs, the shifting operation is terminated, and the upper 8 bits are taken out and output, by way of performing a local quantization or requantization. The rounding or quantization error of the lower eight bits shown by the double hatched lines, are fed back to the input side of the local quantizer by way of so-called noise shaping. Conventionally, six shifting operations were necessitated for the six bits, as shown in FIG. 1c, whereas, in the present example, only three shifting operations, inclusive of the initial four-bit shifting, suffices as shown in FIGS. 4a to 4d, for realizing a high speed operation.

When the input data are of data values in the range from 2048 to 4095, with 12 significant bits, as shown in FIG. 4e, the value obtained upon shifting the data by four bits towards the left, or multiplying the data by 16, exceeds the above maximum value of 32767, that is, overflow occurs. Thus the original data before shifting by four bits towards the left are subjected to the usual floating operation. The data with a data value which is a multiple of 2 and which is in the range from 4096 to 8190, as shown in FIG. 4g obtained upon shifting the original input data shown in FIG. 4e by one bit towards the left, is compared with the above maximum value of 32767. When the data is found to be not more than the maximum value, it is further shifted one bit towards the left to give data which is a multiple of 4 and which is in the range from 8192 to 16380, as shown in FIG. 4h. This data is compared with the above maximum value of 32767. The above described sequence of operations is repeated to give data which is in the range of 16384 to 32760 and which is a multiple of eight, as shown in FIG. 4i. Since the data shown in FIG. 4(i), if shifted by one bit towards the left, exceeds the above maximum value of 32767, that is, overflow occurs, the shifting is terminated and the upper 8 bits are taken out and output, by way of performing local quantization.

Figure 1:
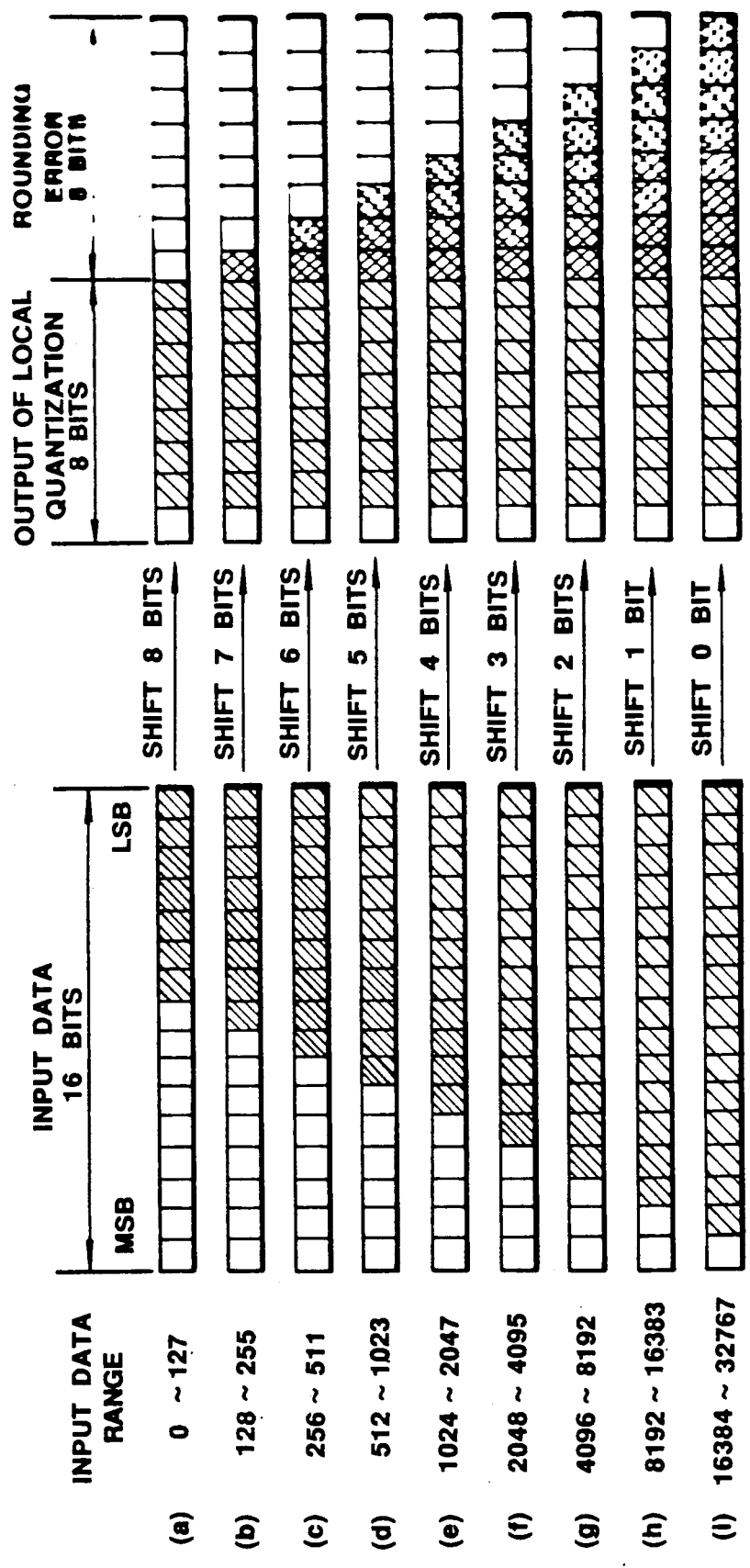
FIGS. 1a to 1f are diagrammatic views for illustrating the floating operation of a conventional band compression circuit.
Figure 2:
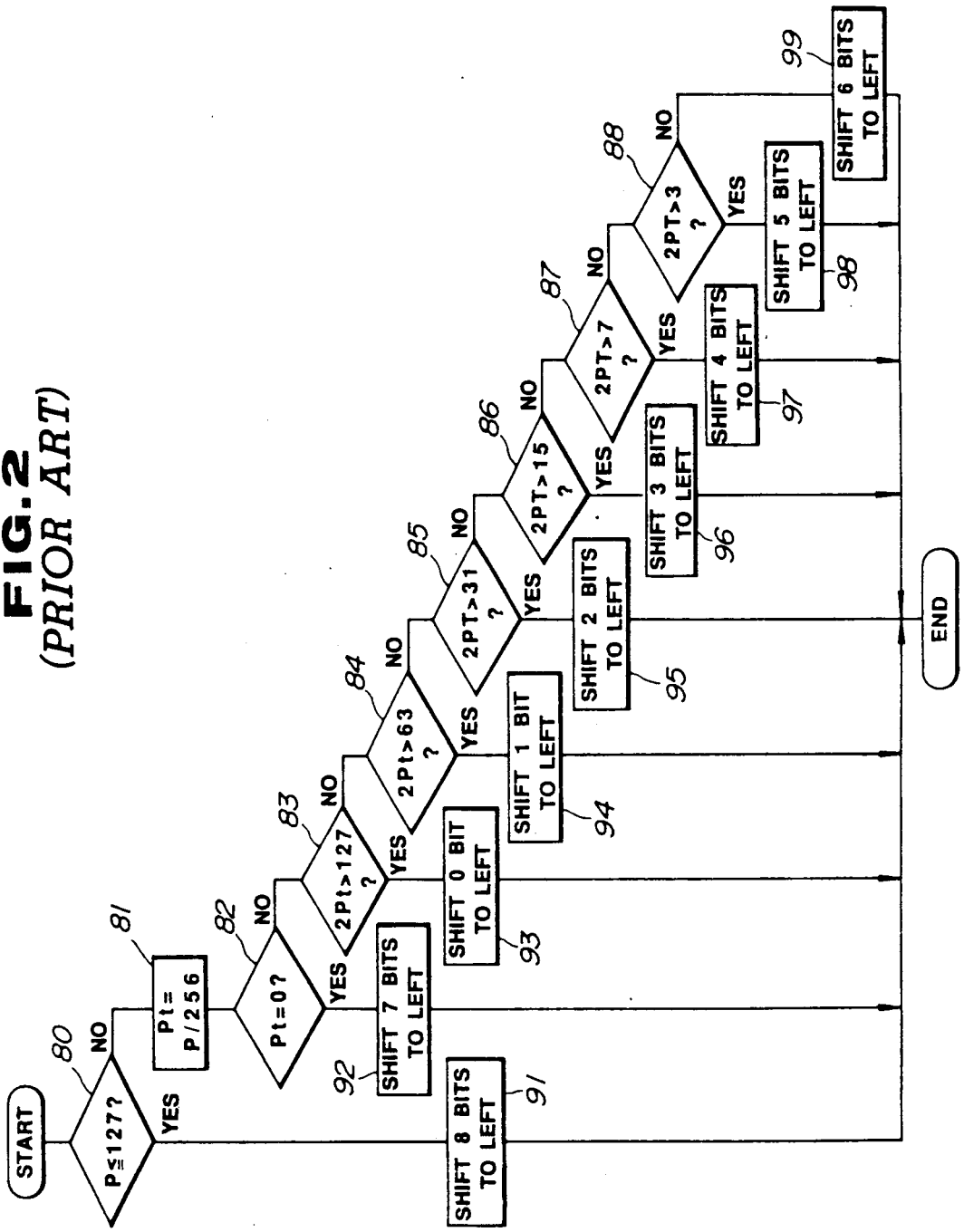
FIG. 2 is a flow chart for illustrating the floating operation of the conventional band compression circuit depicted in FIG. 2.
Figure 4:
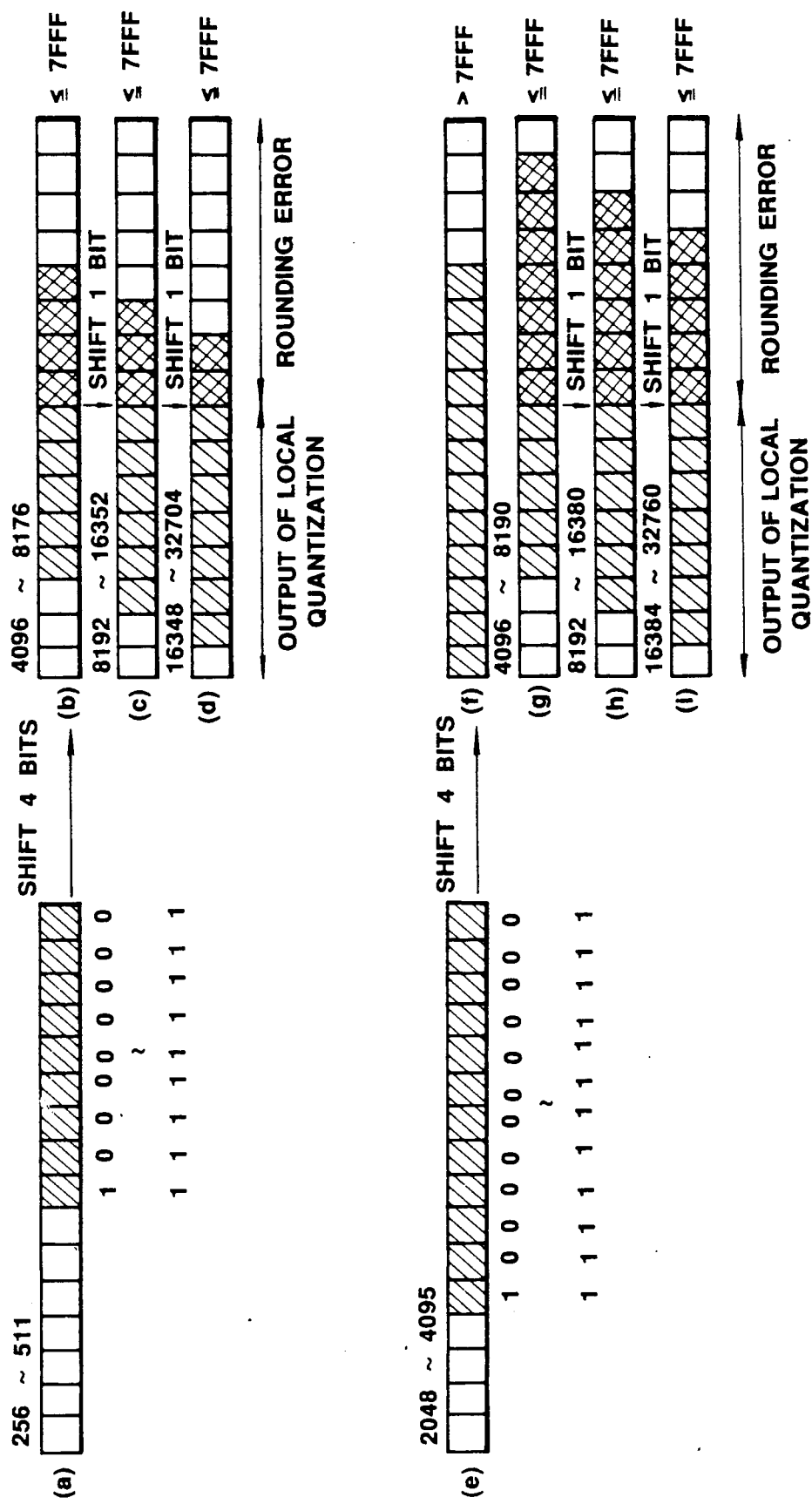
FIGS. 4a to 4i are diagrammatic views for illustrating specific operations in the course of the floating operation of the embodiment shown in FIG. 3.

By the above processing, the maximum number of times of the shifting operations can be reduced from eight bits, as shown in FIG. 1a, in the conventional practice to four at most, inclusive of the initial shifting by four bits, as shown in FIG. 4, for realizing a higher processing operation speed. Even supposing that the 8-bit shifting shown in FIG. 1a or the 7-bit shifting shown in FIG. 1b is performed with the use of a barrel shifter, shifting is required six times for six bits at a maximum, in comparison with only four shifting operations that are required in the case of the present invention.

An example of the essential portions of the program approximately equal to the bit shift looping when the above described operation is performed by a software technique using a so-called digital signal processor (DSP) is shown in the following Table 2:

TABLE 2

|  | LAC | nx, 4 | Load input data into accumulator with 4-bit shifting towards the left |
|---|---|---|---|
|  | SUB | MAX | Compare with MAX(7FFF) |
|  | BLEZ | CHANGE | To "change" if accumulator ≦ MAX |
|  | B | FLOAT | To "float" if accumulator > MAX |
| CHANGE | LAC | xn,4 | Load input data into accumulator with 4-bit shifting towards the left |
|  | SACL | xn | Re-store data in accumulation in memory |
| FLOAT | LAC | xn | Load input data into accumulator with 1-bit shifting towards the left |
|  | SACL | xn | Restore data in accumulator in memory |
|  | SUBS | MAX | Compare with MAX (7FFF) |
|  | BLEZ | FLOAT | To "float" if accumulator ≦ MAX |

Figure 5:
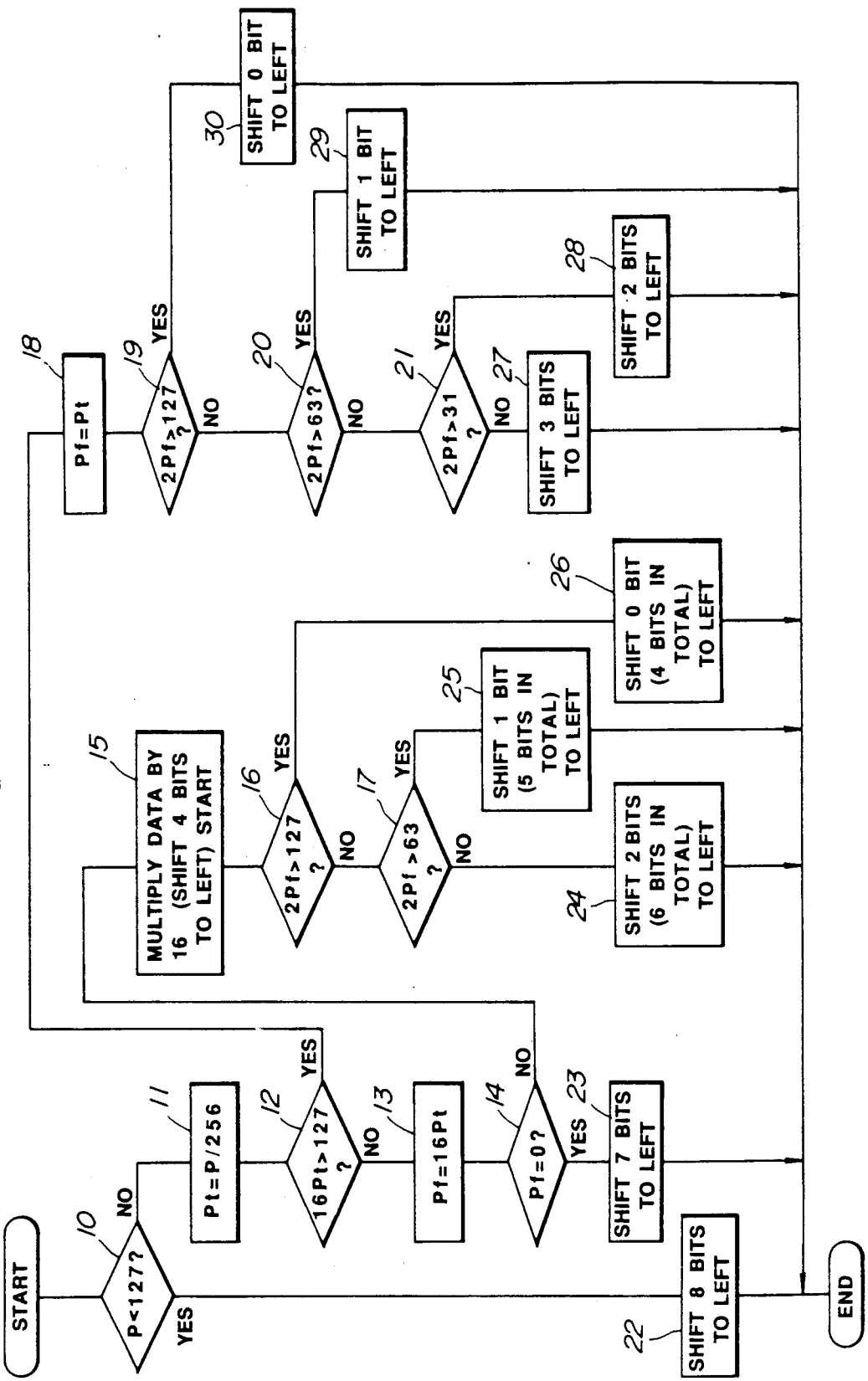
FIG. 5 is a flow chart for illustrating the detailed operations in the course of the floating operation of the embodiment shown in FIG. 3.

Referring now to the flow chart of FIG. 5, an example is shown of a practical program followed by the DSP in which the looping shown in Table 2 is realized by a series of decision blocks and bit shifting by 8 or 7 bits at a time is performed with input data having eight significant bits (with the data value being 0 to 255) to speed up the operation. In this figure, the bit shifting program is applied to a so-called block floating operation in which 16-bit-per-word input data in the 2's complement representation are arranged into a plurality of blocks, each consisting of a predetermined number of, for example, 28 words. The totality of the words in the block are bit-shifted with a common shifting quantity to give compressed 8-bit data, which are then taken out, by way of performing a local quantization. In FIG. 5, P denotes a peak value which is the maximum value of the words in a block. The amount of floating or data shifting on a block-by-block basis is determined as a function of the peak value P. Four bits are adopted as the shifting quantity approximately equal to one half the maximum shifting quantity (m/2).

Referring to FIG. 5, it is first determined at step 10 if the above peak value P is not more than 127 (P≦127?), that is, if the number of the significant bits is not more than 7. If the result of the decision is YES, the program proceeds to step 22 where the input data are shifted towards the left by eight bits to output the upper 8 bits. If the result of the decision is NO, the program proceeds to step 11 where the above peak value P is divided by 256 to take out the upper 8 bits and this becomes the new peak value $P_2$ ($P_t = P/256$). The program then proceeds to step 12.

At this step, the peak value $P_t$ is shifted towards the left by four bits equivalent to a shifting quantity about one half the maximum shifting quantity, that is, the peak value P is multiplied by 16. It is then determined if the value $16P_t$ is larger than 127 ($16P_t > 127$?). This operation is equivalent to determining if the value $16P_t$ has undergone an overflow. If the result of the decision at step 12 is YES, that is if overflow occurs, the program proceeds to step 18. If the result is NO, the program proceeds to step 13.

At this step 13, the peak value $16P_t$ is adopted as the new peak value $P_f$ ($P_f = 16P_t$). The program then proceeds to step 14.

At this step 14, it is determined if the peak value $P_f$ is equal to zero. This operation is equivalent to determining if the original peak value P is 255 or less. If the result of the decision at step 14 is YES, the original peak value P is found to be in the range from 128 to 255, in conjunction with the decision at step 10. Thus the program proceeds to step 23 where the input data are shifted towards the left by 7 bits to output the upper 8 bits. If the result of the decision at step 14 is NO, the program proceeds to step 15.

At this step 15, the input data is multiplied by 16, that is, bit-shifted towards the left by four bits, before the program proceeds to step 16.

At this step 16, it is determined if the value 2 $P_f$, which is twice the peak value $P_f$, is larger than 127 ($2P_f > 127$?). The operation at step 16 is equivalent to determining if, in conjunction With the preceding operation of the decisions at steps 10, 12 and 14, the original peak value P is in the range from 1024 to 2047, that is if the number of significant bits is equal to 11. If the result of the decision is YES, the program proceeds to step 26, where the input data are shifted towards the left by zero bits, that is, the input data is not further shifted. It remains as it is, namely shifted towards the left by four bits at the preceding step 15, and only the upper 8 bits are output.

If the result is NO, the program proceeds to step 17, where it is determined if the value $2P_f$ is larger than 63 ($2P_f > 63$?). The operation at this step 17 is equivalent to determining if in conjunction with the decision at step 16, the number of significant bits of the original peak value P is equal to 10, that is, if the original peak value is within the range of from 512 to 1023. If the result of the decision at step 17 is YES, the program proceeds to step 25 where the input data are shifted towards the left by one bit to output the above mentioned eight bits, since the data have been shifted towards the left by four bits at step 15 so that the total shift quantity towards the left is 5. If the result is NO, the program proceeds to step 24 where the data are shifted towards the left by two bits to output only the upper 8 bits.

If the result of the decision at step 12 is YES, that is, if the value $16P_t$ obtained upon 4-bit shifting towards the left, the program proceeds to step 18, where the peak value $P_t$ is adopted as the new peak value $P_f$. The program then proceeds to step 19.

In a similar manner, in the following decision steps 19 to 21, it is determined if the number of the significant bits of the original peak value P is equal to 15 to 21, respectively. If the results of any of the decisions at the steps 19 to 21 are YES, the program proceeds to steps 27 to 30, respectively, where input data are shifted towards the left by 0 to 3 bits, respectively, to output the upper 8 bits. If the results of any of the decisions at the decision steps 19 and 20 are NO, the program proceeds to the next decision steps 20 and 21, respectively. If the result of the decision at step 21 is NO, the program proceeds to step 27 where the input data are shifted towards the left by three bits to output only the upper 8 bits.

The purpose of replacing the peak value $P_t$ by the new peak value $P_f$ at step 18 is to cause the steps 19 et seq to perform the steps 16 et seq simultaneously to reduce the program volume. More specifically, the steps 16, 17, 24, 25 and 26 can be omitted if the program skips to step 19 via steps 13 to 15 when the result of the decision at step 12 is NO.

Figure 6:
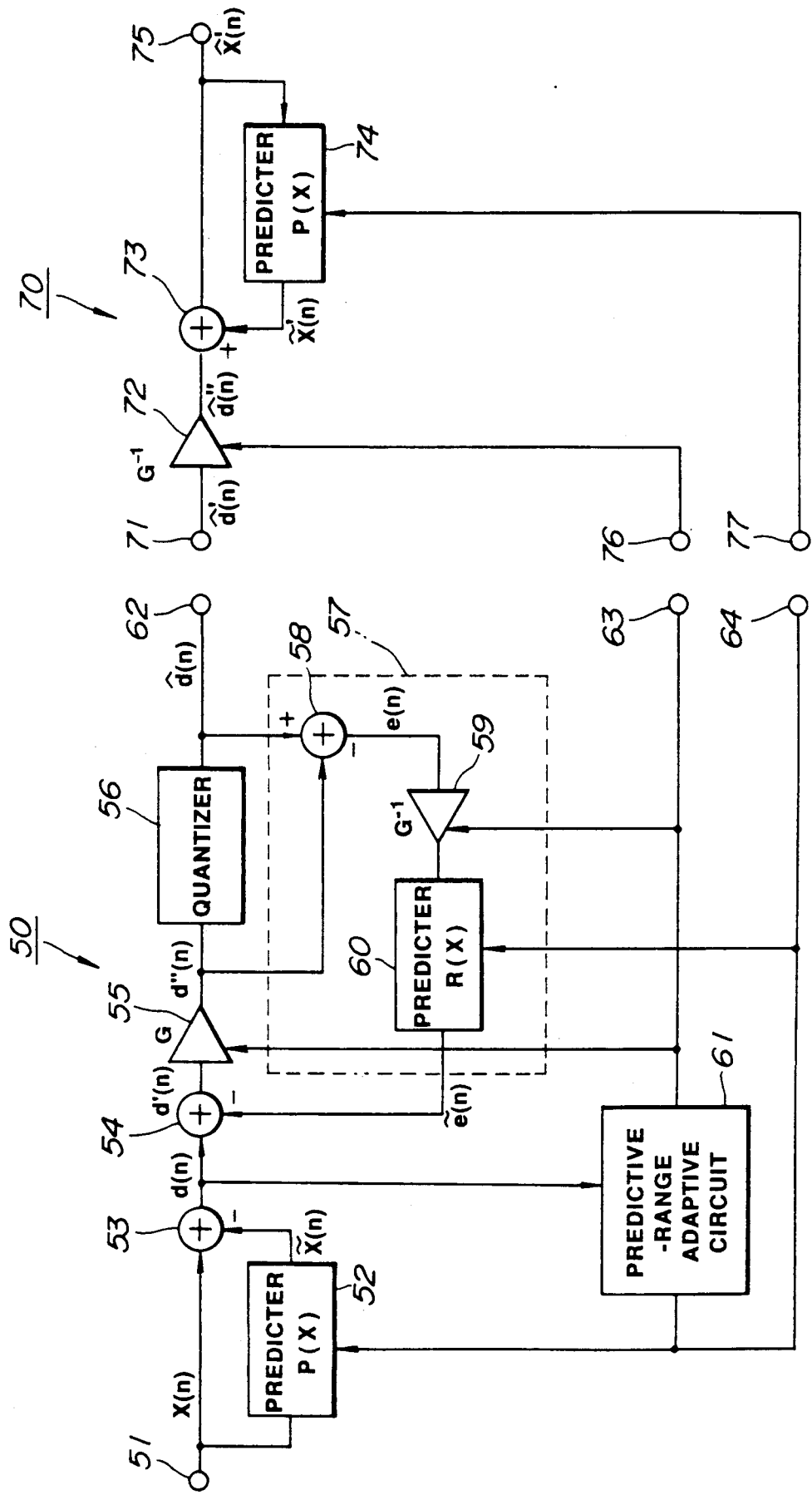
FIG. 6 is a block diagram in which the band compression circuit of the embodiment of FIG. 3 is applied to a customary signal transmission system.

The bit reduction system to which the band compression circuit pertaining to the present invention is applied, is hereinafter explained by referring to FIG. 6.

In this figure, the bit reduction system is composed of an encoder 50 on the transmitting or recording side and a decoder 70 on the receiving or reproducing side.

An audio PCM signal x(n), obtained upon sampling an analog audio signal with a sampling frequency fs, followed by quantization and encoding, is supplied to an input terminal 51 of an encoder 50. From the input terminal 51 the signal x(n) is supplied to a predictor 52 and a summing point 53. The output of the predictor 52 is a prediction signal $\tilde{X}(n)$.

At the summing point 53, the prediction signal $\tilde{X}(n)$ is subtracted from the input signal x(n) to produce an output prediction error signal or a differential output (in the broad sense), that is, a signal $$d(n) = x(n) - \tilde{X}(n) \quad (1)$$

In general, the predicter 52 operates to produce the prediction signal $\tilde{X}(n)$ from the first order combination of the past p number of inputs x(n−p), x(n−p+1), ..., x(n−1), such that $$\tilde{x}(n) = \sum_{k=1}^{p} a_k \cdot x(n-k) \quad (2)$$

where $a_k$ (k being 1, 2, ... p) denotes a coefficient. Thus the prediction error output signal or the differential output d(n) in the broad sense of the term can be expressed as $$d(n) = x(n) = \sum_{k=1}^{p} a_k \cdot x(n-k) \quad (3)$$

With the present signal transmission device, input digital data are arranged into blocks each composed of data within a predetermined time period of input digital signals, that is, a predetermined number l of input data words, and the sets of the coefficients $\alpha_k$ are selected so that optimum prediction filter characteristics will be obtained for each block. This is equivalent to providing a plurality of filters each consisting of predictors of different characteristics, and occasionally summing points, for producing a differential output, that is, a predicted error output. An optimum one of these differential filters is selected for each of the blocks. Such selection of the optimum filter is performed by comparing the peak values in the blocks of the outputs from the differential filters, or the values of the peak values multiplied by coefficients, with one another in a predictive—range adaptive circuit 61. More specifically, one of the differential filters which will give the least of the peak values, or the least of the values of the peak value's multiplied by coefficients is selected as the optimum filter for the block. The optimum filter selection data is output from the prediction range adaptive circuit 61 and is supplied to control the predicter 52, as the mode selection data.

The differential output d(n) is supplied as the prediction error to a bit compression means (ranging or floating processing circuit) which includes a ranging amplifier 55 or bit shifter with a gain G connected in series with a quantizer 56, where compression or ranging is performed in such a manner that the exponent and mantissa in the floating decimal point representation correspond to the gain G and the output from the quantizer 56, respectively. The ranging amplifier or bit shifter 55 performs a shifting, that is, an arithmetic shifting, of the digital binary data by a number of bits corresponding to the gain G to thereby switch the so-called range, while the quantizer 56 performs a requantization for taking out a predetermined number of bits from the bit-shifted data. A noise shaping circuit 57 performs a so-called error feedback operation in which an error (e(n)) between the output ($\hat{d}(n)$) and the input (d''(n)) of the quantizer 56, i.e. the so-called quantization error, is obtained at a summing point 58 and input to a predicter 60 via an amplifier or shifter 59 with a gain $G^{-1}$ to produce a prediction signal $\tilde{e}(n)$ of the quantization error which prediction signal then fed back as the subtraction signal to a summing point 54 at the input to the ranging amplifier 55.

In addition to mode selection data, the predictive-range adaptive circuit 61 also outputs range data on the basis of the maximum value within the block of the differential output from the filter of the selected mode and transmits the range data to the ranging amplifier or bit shifter 55 and to the amplifier 59 to determine the gains G and $G^{-1}$, respectively, on a block-by-block basis.

The predictive-range adaptive circuit 61 also transmits the mode selection data to the predicter 60 to select the optimum filter characteristics. The above range data from the predictive-range adaptive circuit 61 is taken out at an output terminal 63 and the mode selection data is taken out at an output terminal 64. The basic operation of the noise prediction downstream of the summing point 54 is hereinafter explained. The output d'(n) from the summing point 54 is expressed by $$d'(n) = d(n) - \tilde{e}(n) \qquad (4)$$

which is the above differential output d(n) less the prediction signal $\tilde{e}(n)$ of the quantization error from the shaper 57. The output d''(n)

$$d''(n) = G \cdot d'(n) \qquad (5)$$

is obtained from the gain G shifter. On the other hand, with the quantization error e(n) that is produced in the course of the quantization, the output $\hat{d}(n)$ from the quantizer 56 is given by $$\hat{d}(n) = d''(n) + e(n) \qquad (6)$$

The quantization error e(n) is taken out at the summing point 58 of the noise shaper 57. The prediction signal $\tilde{e}(n)$ of the quantization error obtained via gain $G^{-1}$ shifter 59 and the predicter 60 taking a first order combination of the past r number of inputs is given by $$\tilde{e}(n) = \sum_{k=1}^{r} \beta_k \cdot e(n-k) \cdot G^{-1} \qquad (7)$$

This equation (7) is of similar form to the equation (2). The predicters 52 and 60 are finite impulse response (FIR) filters having the system functions $$\left.\begin{array}{l} P(z) = \sum_{k=1}^{p} \alpha_k z^{-k} \\ R(z) = \sum_{k=1}^{r} \beta_k z^{-k} \end{array}\right\} \qquad (8)$$

respectively.

From these equations (4) to (7), the output $\hat{d}(n)$ from the quantizer 56 is given by $$\begin{aligned} \hat{d}(n) &= G \cdot (d(n) - \tilde{e}(n)) + e(n) \\ &= G \cdot d(n) + e(n) - \sum_{k=1}^{r} \beta_k \cdot e(n-k) \end{aligned} \qquad (9)$$

Substituting the equation (3) into equation (9), we obtain $$\hat{d}(n) = G \cdot \left( x(n) - \sum_{k=1}^{p} \alpha_k \cdot x(n-k) \right) + e(n) - \qquad (10)$$

$$\sum_{k=1}^{r} \beta_k \cdot e(n-k)$$

this output being taken out via output terminal 62. With the z-transform of x(n), e(n) and $\hat{d}(n)$ being X(Z), E(Z) and $\hat{D}(Z)$, respectively, we obtain $$\begin{aligned} \hat{D}(z) &= G \cdot X(z) \left( 1 - \sum_{k=1}^{p} \alpha_k \cdot z^{-k} \right) + \\ & E(z) \left( 1 - \sum_{k=1}^{r} \beta_k \cdot z^{-k} \right) \\ &= G \cdot \tilde{X}(z)(1 - P(z)) + E(z)(1 - R(z)) \end{aligned} \qquad (11)$$

On the other hand, the output $\hat{d}(n)$ from the output terminal 62 of the encoder 50 or the output d'(n) obtained upon reproduction is transmitted to an input terminal 71 of a receiving or reproducing recorder 70. This input signal d'(n) is transmitted to a summing point 73 via a gain $G^{-1}$ amplifier or shifter 72. The output X'(n) from the summing point 73 is transmitted to a predicter 74 which produces a prediction signal $\tilde{X}'(n)$ which is transmitted to the summing point 73 so as to be summed with the output $\hat{d}''(n)$ from the amplifier or shifter 72. This summation output is provided at an output terminal 75 as a decoder output $\hat{X}'(n)$.

The range data and mode selection data output from the output terminals 63 and 64, respectively, of the encoder 50 or transmitted and reproduced are input to the input terminals 76 and 77, respectively, of the decoder 70. The range data from the input terminal 76 is transmitted to the amplifier or shifter 72 to determine the gain $G^{-1}$, while the mode selection data from input terminal 77 is transmitted to the predicter 74 to determine its prediction characteristics. The prediction characteristics of the unit 74 are selected to be equivalent to those of the predicter 52 of the encoder 50.

With the above described decoder 70, the output $\hat{d}''(n)$ from the amplifier or shifter 72 is given by $$\hat{d}''(n) = \hat{d}'(n) \cdot G^{-1} \tag{12}$$

while the output $\hat{X}'(n)$ from summing point 73 is given by $$\hat{X}'(n) = \hat{d}''(n) + \tilde{X}'(n) \tag{13}$$

Since the characteristics of the predicter 74 are selected to be equivalent to those of the predicter 52 of the encoder 50, $$\tilde{x}'(n) = \sum_{k=1}^{p} a_k \cdot \hat{x}'(n-k)$$

so that, from equations (12) and (13), we obtain $$\hat{x}'(n) = G^{-1} \cdot \hat{d}'(n) + \sum_{k=1}^{p} a_k \cdot \hat{x}'(n-k) \tag{14}$$

With the z-transforms of $\hat{X}'(n)$ and $\hat{d}'(n)$ being $\hat{X}'(z)$ and $\hat{D}'(z)$, we obtain $$\begin{aligned} \hat{X}(z) &= G^{-1} \cdot \hat{D}'(z) + \sum_{k=1}^{p} a_k \cdot \hat{X}'(z) \cdot z^{-k} \\ &= G^{-1} \cdot \hat{D}'(z) + P(z) \cdot \hat{X}'(z) \end{aligned} \tag{15}$$

so that $$\hat{X}'(z) = \frac{G^{-1} \cdot D'(z)}{1 - P(z)} \tag{16}$$

The present invention can be applied with favorable results for implementing the floating at the ranging amplifier 55 and the quantizer 56 in the bit reduction system on the encoder side with the aid of the DSP.

With the above described band compression circuit of the present invention, the 16-bit input data are shifted by four bits, which is one half the maximum number of shift, before starting the floating operation. Alternatively, in case an overflow occurs by such four-bit shifting, the floating operation reverts to a position one bit towards the left of the position of the original data signal, and the floating operation is started at such position. In this way, especially with input data of 256 to 511, the floating operation of the above described flow chart can be reduced to two loops in contrast to six loops required in the conventional practice for realization of a high speed floating operation.

Thus, with a preprocessing time of 0.8 μsec and a 1-loop floating time of 500 nsec, the maximum computing time amounts to 0.8 μsec for preprocessing plus 500 nsec multiplied by two loops, which accounts for 60% of the computing time with the conventional practice, for realization of a significant reduction in the time involved in the floating operation. Such reduction in the time involved in the floating operation becomes the more acute with a greater variation in the input and output word length and the larger is the required shift quantity.

Since the time involved in floating can be reduced significantly, a compression operation of plural channels can be made by one DSP with the result that increased time can be allocated to other signal processing operations, such as the operation of predictive filters or the operation of storing shift data in other memories, to enable the application of a high quality signal compression algorithm. On the other hand, the present invention also allows the use of a low speed DSP in lieu of the expensive high-speed DSP to perform high speed arithmetic operations at a low system cost.

Although the above description has been made of the case in which the input data are 16-bit data which are divided into the upper 8 bit and the lower 8 bit and only the upper 8 bits are output, the number of the quantization bits can be selected arbitrarily. On the other hand it is sufficient if the number of bits to be shifted previously is approximately equal to one half the maximum shift quantity and thus the number of bits can be 3 or 5 instead of 4 in the above embodiment.

Although the present invention has been shown and described with respect to preferred embodiments, various changes and modifications which are obvious to a person skilled in the art to which the invention pertains are deemed to lie within the spirit and scope of the invention.

What is claimed is:

1. A band compression device for digital signals using a floating operation for bit compressing n-bit input digital data into m bits, where m and n are real integers and m<n, by shifting the n-bit input digital data by an amount corresponding to the magnitude of the n-bit input digital data and taking out m bits by way of local quantization wherein the improvement comprises local quantization means for bit shifting the n-bit input digital data by an amount consistent with the magnitude of the n-bit input digital data and taking out the m bits and including means for selectively shifting the n-bit input digital data all at one time, in advance of the floating operation, by a number of bits approximately equal to one half m, the maximum shift quantity, and comparing this advance shifted input digital data with a predetermined maximum value, and further including means which, if the magnitude of the advance shifted input digital data is not more than the predetermined maximum value, performs local quantization by sequentially bit shifting the advance shifted input digital data, and alternatively, if the magnitude of the advance shifted input data is larger than the maximum value, performs local quantization by sequentially shifting the n-bit input digital data.

2. The band compression circuit according to claim 1 wherein bit shifting by the local quantization means produces a rounding error and further comprising a noise shaping circuit for feeding back the rounding error to the local quantization means.

3. The band compression circuit for digital signals according to claim 1 further comprising a predictor means for computing a predicted value by a first order combination of a predetermined number of past input data, means for computing the difference between the n-bit input digital data and the predicted value and supplying this difference to the local quantization means.

4. A band compression method for digital signals using a floating operation for bit compressing n-bit input digital data into m bits, where m and n are real integers and m<n, by shifting the n-bit input digital data by an amount corresponding to the magnitude and taking out m bits by way of local quantization, wherein the improvement comprises the steps of:

local quantization by bit shifting the n-bit input digital data by an amount consistent with the magnitude of the input digital data and taking out the m bits and including selectively shifting the input digital data all at one time in advance of the floating operation by a number of bits approximately equal to one half m, the maximum shift quantity, and comparing this advance shifted input digital data with a predetermined maximum value and if the magnitude of the advance shifted input digital data shifted is not more than the maximum value m, local quantization is performed by sequentially bit shifting the advance shifted input digital data, and alternatively, if the magnitude of the advance shifted input digital data is larger than the maximum value, local quantization is performed by sequentially shifting the input digital data.

5. The band compression method according to claim 4 wherein bit shifting by the local quantization steps produces a rounding error and further comprising feeding back the rounding error and performing a noise shaping step in advance of the local quantization steps.

6. The band compression method for digital signals according to claim 4 further comprising the step of computing a predicted value by a first order combination of a predetermined number of past input data, computing the difference between the n-bit input data and the predicted value and using this computed difference in the local quantization steps to control ranging.

7. A band compression apparatus for digital signals and including means for performing a floating operation for bit compressing n-bit input digital data into m bits, where m and n are real integers and m<n, and further comprising:

(a) means for shifting the all of the input digital data at one time, in advance of the start of the floating operation, by a number of bits approximately equal to one half m, the maximum shift quantity, and (b) means for comparing the advance shifted input digital data with a predetermined maximum value and, (i) if the advance shifted input digital data exceed the maximum value, performing the floating operation on the input digital data while shifting it by one bit each time, whereas, (ii) if the advance shifted input digital data are less than the maximum value, performing the floating operation on the advance shifted input digital data while shifting it by one bit each time.

8. A band compression method for digital signals using a floating operation for bit compressing n-bit input digital data into m bits, where m and n are real integers and m<n, comprising the steps of:

(a) shifting all of the input digital data at one time, in advance of the start of the floating operation, by a number of bits approximately equal to one half m, the maximum shift quantity, and (b) comparing this advance shifted input digital data with a predetermined maximum value and, (i) if the advance shifted input digital data exceed the maximum value, the input digital data are then subjected to the floating operation while shifting the input digital data by one bit each time, whereas, (ii) if the advance shifted input digital data are less than the maximum value, the advance shifted input digital data produced at step (a) are subjected to the floating operation while shifting by one bit each time.

* * * * *